(12) United States Patent
Sharma et al.

(10) Patent No.: US 11,784,997 B2
(45) Date of Patent: Oct. 10, 2023

(54) SYSTEM AND METHOD FOR AUTHENTICATING SECONDARY USERS OF AN ENTITY SYSTEM

(71) Applicant: BANK OF AMERICA CORPORATION, Charlotte, NC (US)

(72) Inventors: Divya Sharma, New Delhi (IN); Nandini Rathaur, Telangana (IN); Sandeep Verma, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 371 days.

(21) Appl. No.: 17/143,831

(22) Filed: Jan. 7, 2021

(65) Prior Publication Data
US 2022/0217128 A1 Jul. 7, 2022

(51) Int. Cl.
*H04L 9/40* (2022.01)

(52) U.S. Cl.
CPC .................. *H04L 63/083* (2013.01)

(58) Field of Classification Search
None
See application file for complete search history.

(56) References Cited

U.S. PATENT DOCUMENTS

| | | |
|---|---|---|
| 6,304,860 B1 | 10/2001 | Martin, Jr. et al. |
| 7,577,614 B1 | 8/2009 | Warren et al. |
| 7,840,485 B1 | 11/2010 | Warren et al. |
| 7,946,480 B2 | 5/2011 | Miller et al. |
| 8,459,546 B1 | 6/2013 | Block et al. |
| 8,511,542 B2 | 8/2013 | Pan |
| 8,608,055 B1 | 12/2013 | Carpenter et al. |
| 9,715,003 B2 | 7/2017 | Tseng et al. |
| 9,881,302 B1 | 1/2018 | White et al. |
| 10,592,903 B2 | 3/2020 | Henderson et al. |
| 10,867,294 B2 | 12/2020 | Gupta et al. |
| 10,984,088 B2* | 4/2021 | Goodsitt .......... G06K 19/06037 |
| 11,537,830 B2* | 12/2022 | Sinha ................. G06Q 20/401 |
| 2004/0206816 A1 | 10/2004 | Gokli et al. |
| 2005/0085931 A1 | 4/2005 | Willeby |
| 2009/0063339 A1 | 3/2009 | Santora |
| 2013/0054465 A1 | 2/2013 | Sakata et al. |

(Continued)

FOREIGN PATENT DOCUMENTS

JP 3994363 B2 10/2007

*Primary Examiner* — Brandon Hoffman
(74) *Attorney, Agent, or Firm* — Moore & Van Allen PLLC; Nicholas C. Russell

(57) ABSTRACT

Embodiments of the present invention provide a system for facilitating a secure way to allow primary users and secondary users to perform interactions. In particular, the system may be configured to receive an interaction request from a primary user, where the interaction request comprises location of an automated machine, initiate and lock a session between the automated machine and the entity application located on the user device of the primary user, identify a trigger and display a code on the automated machine, wherein the code is scannable by the user device of the primary user or a user device of an authorized secondary user, receive a scanned code from the user device of the primary user or the user device of the authorized secondary user, determine a match between the scanned code and the code displayed on the automated machine, and complete the interaction.

14 Claims, 6 Drawing Sheets

(56) References Cited

U.S. PATENT DOCUMENTS

2013/0085940 A1    4/2013   OLaughlin et al.
2013/0226799 A1    8/2013   Raj
2013/0339235 A1   12/2013   Tulluri et al.

\* cited by examiner

SYSTEM AND METHOD FOR AUTHENTICATING SECONDARY USERS OF AN ENTITY SYSTEM

BACKGROUND

There exists a need for an improved system that facilitates a secure way to allow primary users and authorized secondary users of an entity system to perform one or more interactions on entity devices.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for facilitating a secure way to allow primary users and secondary users of an entity system to perform one or more interactions on entity devices. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives an interaction initiation request associated with an interaction from a primary user, via an entity application located on a user device associated with the primary user, wherein the interaction initiation request comprises a location associated with an automated machine, establishes a link with the automated machine and the user device of the primary user, locks a session between the automated machine and the entity application located on the user device of the primary user, identifies a trigger and transmit a first set of instructions to the automated machine, wherein the first set of instructions transform user interface of the automated machine to display a code, wherein the code is scannable by the user device of the primary user or a user device of an authorized secondary user, receives a scanned code from the user device of the primary user or the user device of the authorized secondary user, determines a match between the scanned code and the code displayed on the automated machine, and in response to determining the match, transmits a second set of instructions to the automated machine, wherein the second set of instructions cause the automated machine to complete the interaction.

In some embodiments, the present invention identifies the trigger based on determining that a location of the user device of the primary user matches the location of the automated machine.

In some embodiments, the present invention transmits an interaction link to the user device of the primary user in response to determining that the location of the user device of the primary user matches the location of the automated machine, wherein the interaction link allows the primary user to scan the code displayed on the automated machine.

In some embodiments, the present invention identifies the trigger based on determining that a location of the user device of the authorized secondary user matches the location of the automated machine.

In some embodiments, the present invention transmits an interaction link to the user device of the authorized secondary user in response to determining that the location of the user device of the authorized secondary user matches the location of the automated machine, wherein the interaction link allows the authorized secondary user to scan the code displayed on the automated machine.

In some embodiments, the present invention in response to receiving the scanned code from the user device of the authorized secondary user and determining the match between the scanned code and the code, transmits a third set of instructions to the user device of the primary user, wherein the third set of instructions transform a user interface of the entity application to receive interaction information from the primary user, receives the interaction information from the primary user, and completes the interaction based on the interaction information.

In some embodiments, receiving the interaction initiation request further comprises receiving user information associated with the authorized secondary user, wherein the user information comprises at least a phone number and a user id associated with the authorized secondary user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
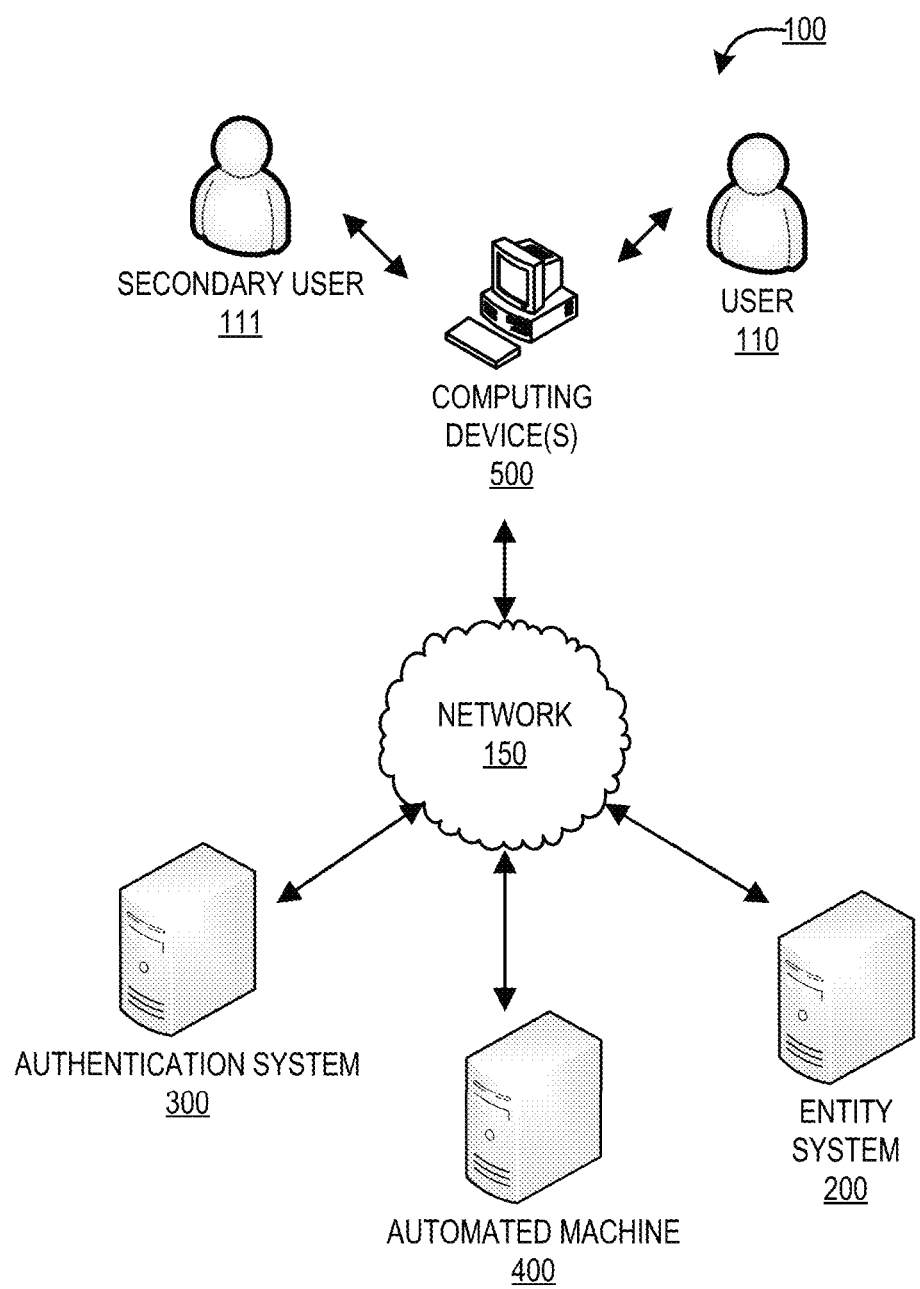
Figure 2:
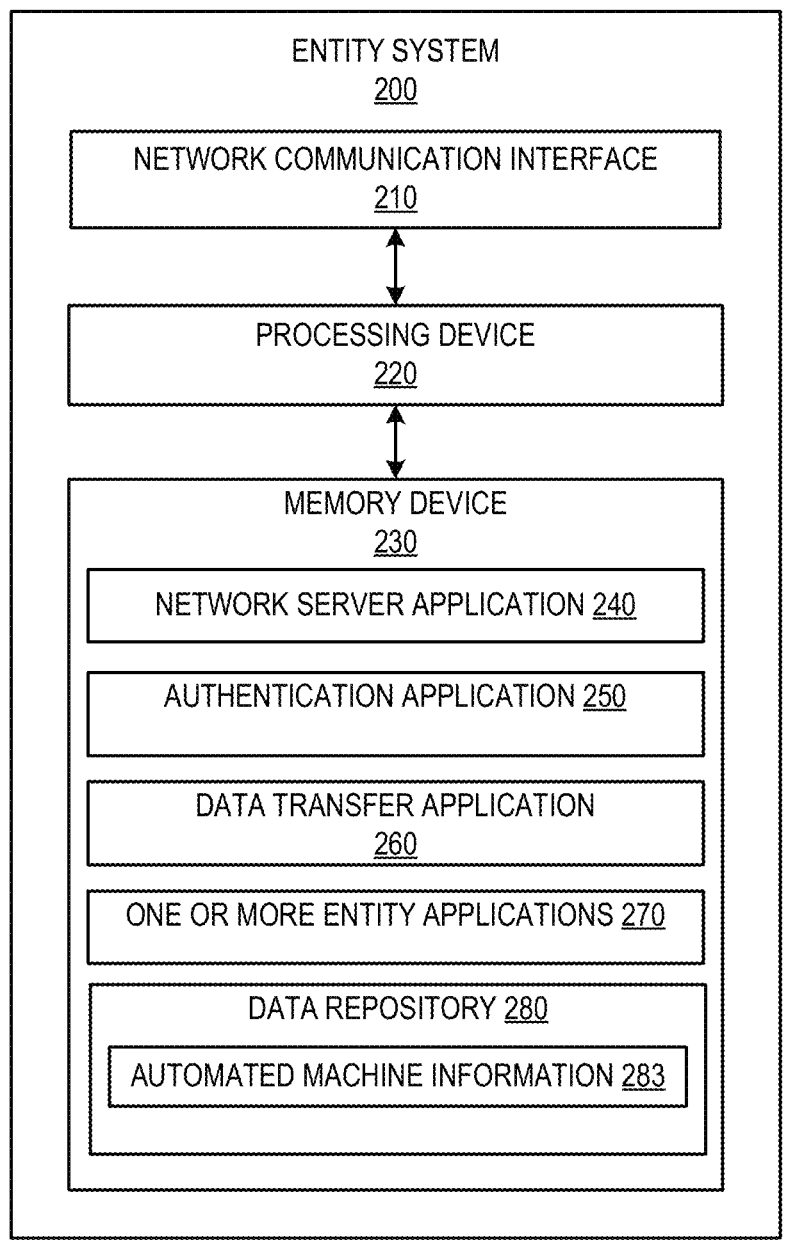
Figure 3:
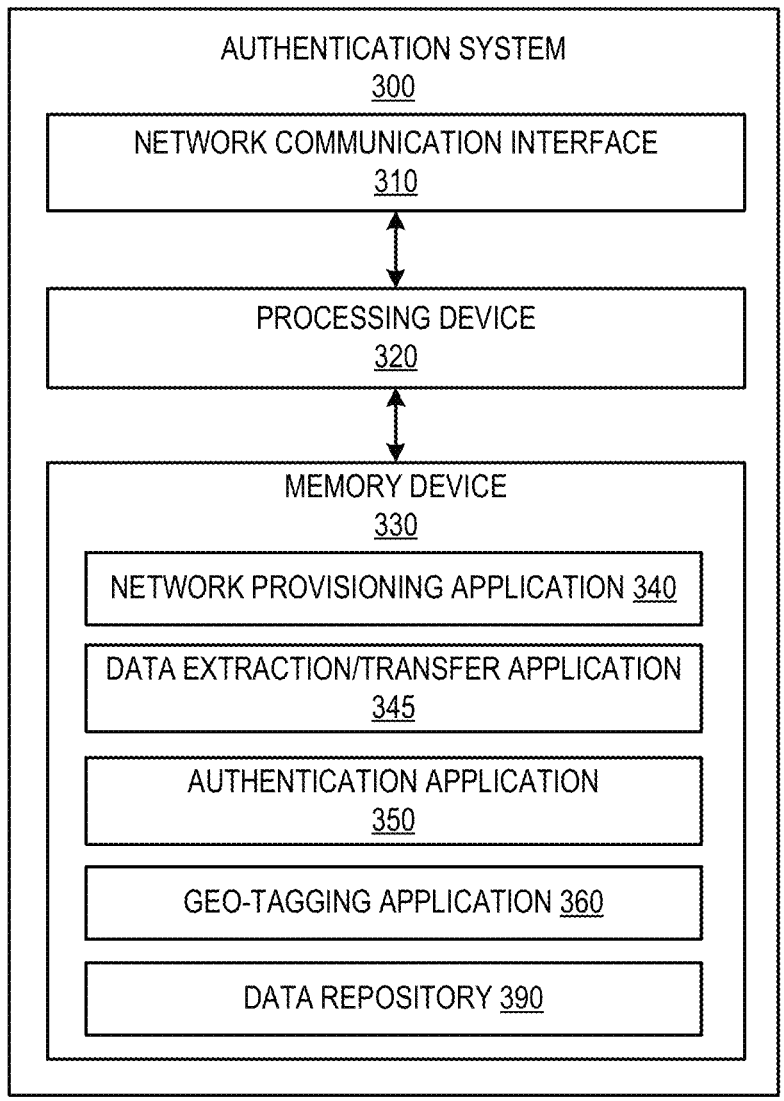
Figure 4:
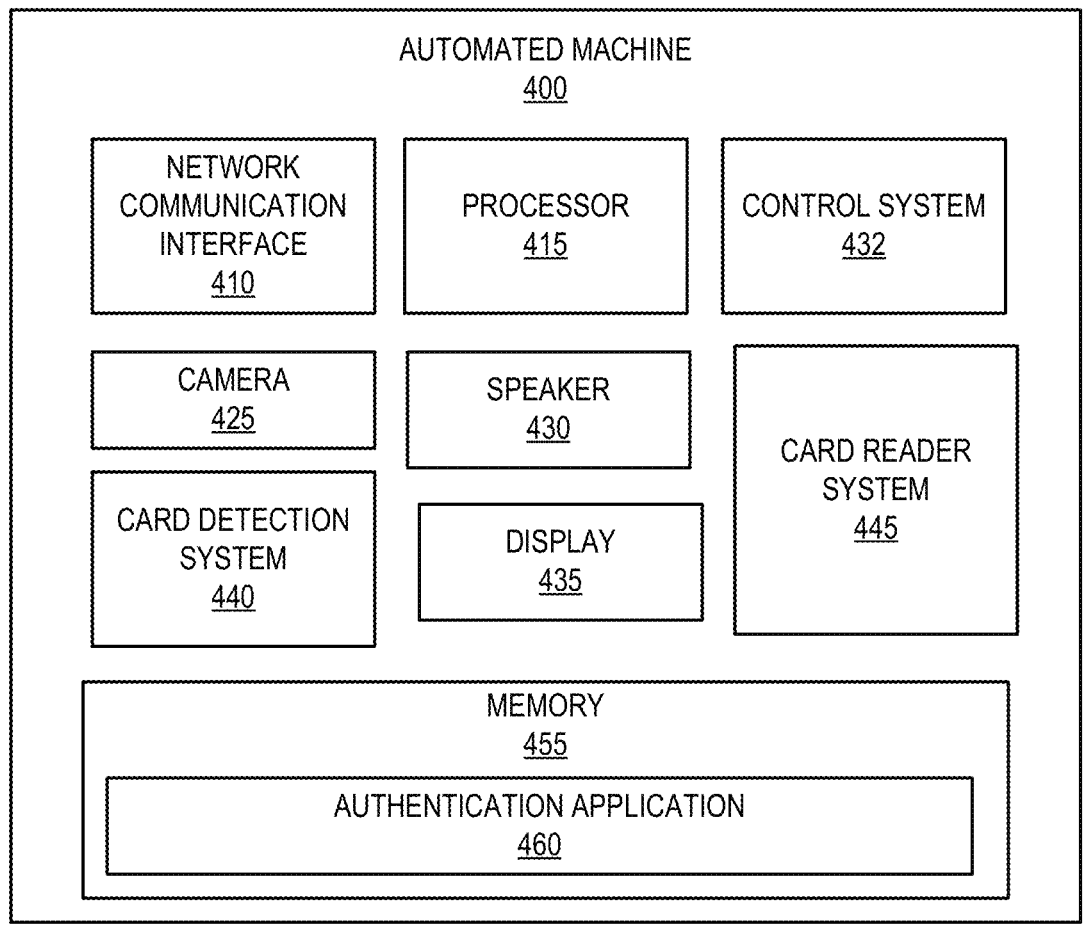
Figure 5:
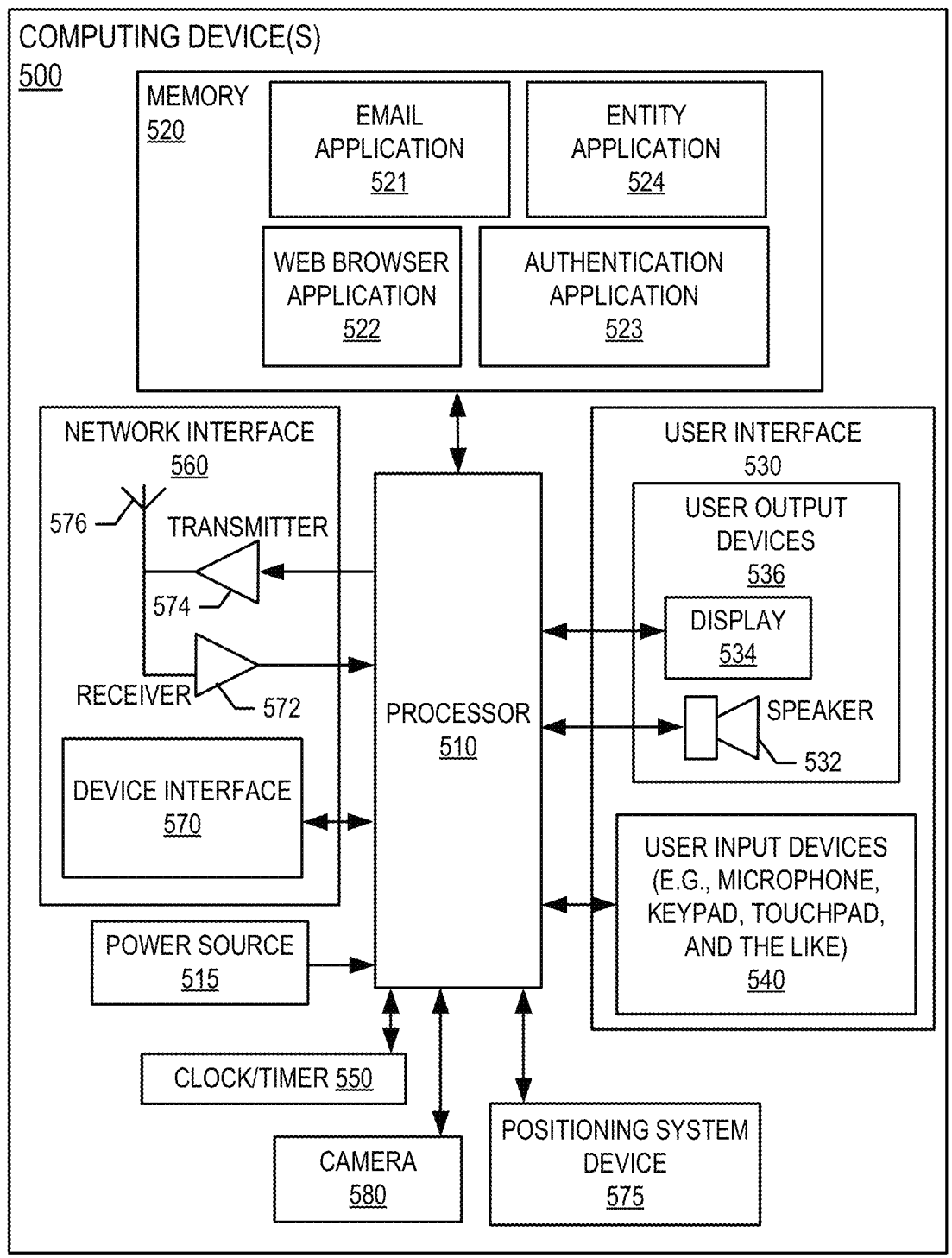
Figure 6:
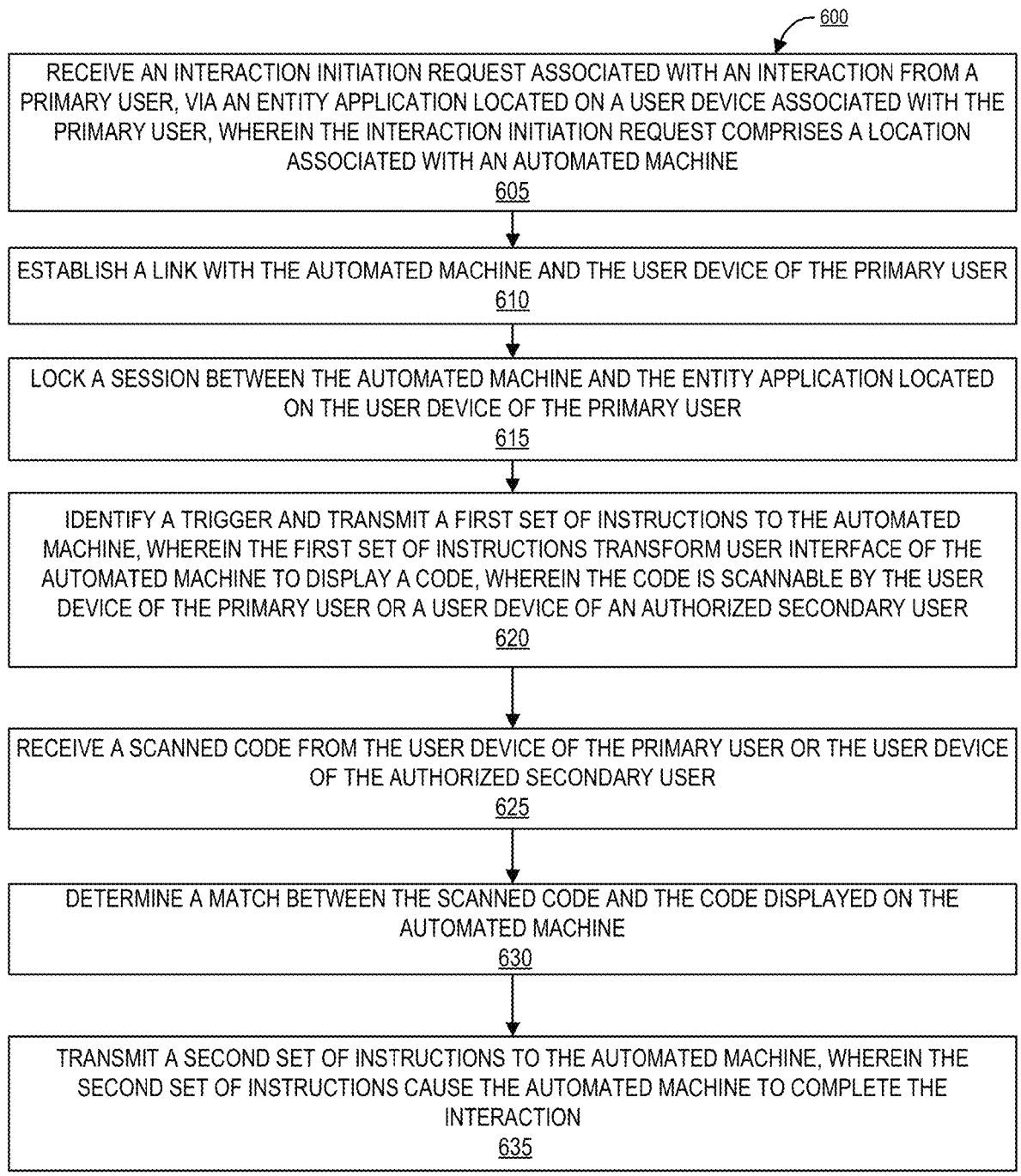

Having thus described embodiments of the invention in general terms, reference will now be made the accompanying drawings, wherein:

FIG. 1 provides a block diagram illustrating a system environment for facilitating a secure way to allow primary users and secondary users of an entity system to perform one or more interactions on entity devices, in accordance with an embodiment of the invention;

FIG. 2 provides a block diagram illustrating the entity system 200 of FIG. 1, in accordance with an embodiment of the invention;

FIG. 3 provides a block diagram illustrating a authentication system 300 of FIG. 1, in accordance with an embodiment of the invention;

FIG. 4 provides a block diagram illustrating an automated machine 400 of FIG. 1, in accordance with an embodiment of the present invention;

FIG. 5 provides a block diagram for a computing device 500 of FIG. 1, in accordance with an embodiment of the present invention; and FIG. 6 provides a block diagram illustrating a process flow for facilitating a secure way to allow primary users and secondary users of an entity system to perform one or more interactions on entity devices, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity. In some embodiments of the present invention, the entity device may be an automated machine. As used herein, the term "automated machine" may be any automated devices that are involved in distribution of resources such as cash, checks, electronic transfers, money orders or the like which may be performed using a credit card, a debit card, or the like. In some embodiments of the present invention, the automated machine may be an Automated Teller Machine (ATM). In some embodiments, the automated machine may be owned and/or controlled by the resource entity.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional systems require a primary user associated with a resource pool managed/maintained by the entity to be present at an entity device (e.g., an automated machine) to perform interactions (e.g., withdrawal of resources) with the entity device. In some instances, the primary user may not have the ability to be physically present at the entity device to perform the interaction and conventional systems do not allow a secondary user to perform the interaction on behalf of the primary user. Additionally, conventional systems also do not allow the primary users to perform contactless interactions with the entity device (i.e., the user is required to manually enter information onto the display of the entity device). As such, there exists a need for a system that overcomes these challenges to allow the primary user to perform contactless interaction and also to allow a secondary user to perform the interaction on behalf of the primary user. The system of the present invention solves the aforementioned problems by facilitating a secure way to allow primary users and secondary users to perform interactions with entity devices.

FIG. 1 provides a block diagram illustrating a system environment 100 for facilitating a secure way to allow primary users and secondary users of an entity system to perform one or more interactions on entity devices, in accordance with an embodiment of the invention. As illustrated in FIG. 1, the environment 100 includes an authentication system 300, one or more automated machines 400, and one or more computing devices 500 used by user 110 and secondary user 120. In some embodiments, the environment 100 may include other entity devices that perform at least one or more actions as that of the one or more automated machines 400.

In some embodiments, the authentication system 300 may be a part of the entity system 200. In some embodiments, the authentication system 300 may be a remote and independent system which interacts with other systems in the system environment to perform one or more steps described herein. In some embodiments, the authentication system 300 and the one or more automated machines 400 may be owned by a resource entity associated with the entity system 200. In some embodiments, the automated machine 400 may be operated and/or controlled by the authentication system 300. In some embodiments, the one or more automated machines 400 may be operated and/or controlled by the entity systems 200. In some embodiments, the one or more automated machines 400 may be operated and/or controlled by both the authentication system 300 and the entity system 200.

The entity system(s) 200 may be any system owned or otherwise controlled by the resource entity. The entity may be any entity which is involved in financial transactions. In some embodiments, the entity is a financial institution. The authentication system 300 and/or the automated machine 400 may communicate with entity system 200 to perform one or more steps described herein.

The authentication system 300, the entity system 200, the computing device 500, and/or the one or more automated machines 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an authentication application 250, a data transfer application 260, one or more entity applications 270, and a data repository 280 comprising automated machine information 283 (e.g., automated machine location, automated machine id, or the like). The automated machine information 283 may be any information associated with the one or more automated machines 400. The computer-executable program code of the network server application 240, the authentication application 250, the data transfer application 260, and the one or more entity applications 270 may instruct the processing device 220 to perform certain logic, data-extraction, and data-storing functions of the entity system 200 described herein, as well as communication functions of the entity system 200.

The network server application 240, the authentication application 250, the data transfer application 260, and the one or more entity applications 270 are configured to store data in the data repository 280 or to use the data stored in the data repository 280 when communicating through the network communication interface 210 with the authentication system 300 and the one or more automated machines 400 to perform one or more process steps described herein. In some embodiments, the entity system 200 may receive instructions from the authentication system 300 via the authentication application 250 to perform one or more operations.

FIG. 3 provides a block diagram illustrating the authentication system 300 in greater detail, in accordance with embodiments of the invention. As mentioned above, the authentication system 300 of FIG. 1 is configured to perform the one or more functions described herein.

As illustrated in FIG. 3, in one embodiment of the invention, the authentication system 300 includes one or more processing devices 320 operatively coupled to a network communication interface 310 and a memory device 330. In some embodiments, the authentication system 300 is operated by the resource entity, such as a financial institution. In some embodiments, the authentication system 300 may be an independent system. In alternate embodiments, the authentication system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the authentication system 300 described herein. For example, in one embodiment of the authentication system 300, the memory device 330 includes, but is not limited to, a network provisioning application 340, a data extraction/transfer application 345, an authentication application 350, a geotagging application 360, and a data repository 390. In some embodiments, the memory device may also include a code generator (not shown) that generates one or more interaction specific codes that are to be displayed on the automated machine 400 and used for authenticating the primary and/or the secondary user. The computer-executable program code of the network provisioning application 340, the data extraction/transfer application 345, the authentication application 350, and the geotagging application 360 may instruct the processing device 320 to perform certain logic, data-processing, and data-storing functions of the authentication system 300 described herein, as well as communication functions of the authentication system 300.

In some embodiments, the network provisioning application 340, the data extraction/transfer application 345, the authentication application 350, and the geotagging application 360 may be a part of single application. The network provisioning application 340 may allow the authentication system 300 to communicate with the one or more automated machines 400, and entity system 200 to perform one or more operation disclosed in the process flow below.

FIG. 4 provides a block diagram of the automated machine 400, in accordance with an embodiment of the present invention. As illustrated in FIG. 4, in one embodiment of the invention, the automated machine 400 includes a processor 415 operatively coupled to a network communication interface 410, a memory component 455, a control system 432, a camera 425, a speaker 430, a display 435, a card detection system 440, a card reader system 445, and one or more secure item storage units 450. The card detection system 440 and the card reader system 445 may be mechanisms that aid the transactions performed at the automated machine. The automated machine 400 may include other components such as bar code scanner, item counter, and/or item tracker to perform multiple functions of the automated machine 400 as described in the process flow below. The one or more secure item storage units 450 may be any secure container (e.g., cassettes) that hold items such as cash bills, checks, or the like. Each of the one or more secure item storage units may be configured to receive and/or dispense certain items. For example, a first secure item storage unit may be configured to receive cash bills, a second secure item storage unit may be configured to received checks, and a third secure item storage unit may be configured to dispense cash bills.

It should be understood that the memory 455 may include one or more databases or other data structures/repositories. The memory 455 includes a authentication application 460 that comprises computer-executable program code that instructs the processor 415 to operate the network communication interface 410 to perform certain communication functions of the automated machine 400 described herein and also instructs the processor 415 to cause the control system 432 to perform certain actions of the automated machine 400 including, but not limited to, dispensing items, displaying messages on the display 435, tracking items, performing item count, or the like. In some embodiments, based on the instructions and control signals received from the authentication system 300 or the executable instructions present in the authentication application 460, the processor 415 via the control system 432 may operate the automated machine 400 such as displaying messages on the display 435, completing settlement process, or perform its certain other actions described herein.

FIG. 5 provides a block diagram illustrating the computing systems 500 of FIG. 1 in more detail, in accordance with embodiments of the invention. The computing device 500 may be a mobile telephone or any other mobile device. However, it should be understood that a mobile telephone is merely illustrative of one type of the computing device 500 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device 500 include a processor 510 communicably coupled to such devices as a memory 520, user output devices 536, user input devices 540, a network interface 560, a power source 515, a clock or other timer 550, a camera 580, and a positioning system device 575. The processor 510, and other processors described herein, generally include circuitry for implementing communication and/or logic functions of the computing device 500. For example, the processor 510 may include a digital signal processor device, a microprocessor device, and various analog to digital converters, digital to analog converters, and/or other support circuits. Control and signal processing functions of the computing device 500 are allocated between these devices according to their respective capabilities. The processor 510 thus may also include the functionality to encode and interleave messages and data prior to modulation and transmission. The processor 510 can additionally include an internal data modem. Further, the processor 510 may include functionality to operate one or more software programs, which may be stored in the memory 520. For example, the processor 510 may be capable of operating a connectivity program, such as a web browser application 522. The web browser application 522 may then allow the computing device 500 to transmit and receive web content, such as, for example, location-based content and/or other web page content, according to a Wireless Application Protocol (WAP), Hypertext Transfer Protocol (HTTP), and/or the like.

The processor 510 is configured to use the network interface 560 to communicate with one or more other devices on the network 150. In this regard, the network interface 560 includes an antenna 576 operatively coupled to a transmitter 574 and a receiver 572 (together a "transceiver"). The processor 510 is configured to provide signals to and receive signals from the transmitter 574 and receiver 572, respectively. The signals may include signaling information in accordance with the air interface standard of the applicable cellular system of the network 150. In this regard, the computing device 500 may be configured to operate with one or more air interface standards, communication protocols, modulation types, and access types. By way of illustration, the computing device 500 may be configured to operate in accordance with any of a number of first, second, third, fourth-generation, and/or fifth generation communication protocols and/or the like. The computing device 500 may also be configured to operate in accordance with non-cellular communication mechanisms, such as via a wireless local area network (WLAN) or other communication/data networks.

As described above, the computing device 500 has a user interface that is, like other user interfaces described herein, made up of user output devices 536 and/or user input devices 540. The user output devices 536 include a display 530 (e.g., a liquid crystal display or the like) and a speaker 532 or other audio device, which are operatively coupled to the processor 510.

The computing device 500 may also include a positioning system device 575 that is configured to be used by a positioning system to determine a location of the computing device 500. For example, the positioning system device 575 may include a GPS transceiver. In some embodiments, the positioning system device 575 is at least partially made up of the antenna 576, transmitter 574, and receiver 572 described above. For example, in one embodiment, triangulation of cellular signals may be used to identify the approximate or exact geographical location of the computing device 500. In other embodiments, the positioning system device 575 includes a proximity sensor or transmitter, such as an RFID tag, that can sense or be sensed by automated machines 400 or any other devices known to be located proximate a merchant or other location to determine that the computing device 500 is located proximate these known devices and/or automated machines 400.

The computing device 500 further includes a power source 515, such as a battery, for powering various circuits and other devices that are used to operate the computing device 500. Embodiments of the computing device 500 may also include a clock or other timer 550 configured to determine and, in some cases, communicate actual or relative time to the processor 510 or one or more other devices.

The computing device 500 also includes a memory 520 operatively coupled to the processor 510. As used herein, memory includes any computer readable medium (as defined herein below) configured to store data, code, or other information. The memory 520 may include volatile memory, such as volatile Random Access Memory (RAM) including a cache area for the temporary storage of data. The memory 520 may also include non-volatile memory, which can be embedded and/or may be removable. The non-volatile memory can additionally or alternatively include an electrically erasable programmable read-only memory (EEPROM), flash memory or the like.

The memory 520 can store any of a number of applications which comprise computer-executable instructions/code executed by the processor 510 to implement the functions of the computing device 500 and/or one or more of the process/method steps described herein. For example, the memory 520 may include such applications as a conventional web browser application 522, an email application 521, an entity application 524, an authentication application 523, or the like. The email application 521, the web browser application 522, the authentication application 523 may allow the plurality of users 110 to communicate with the authentication system 300, the one or more automated machines 400, and/or the entity systems 200. The entity application 524 allows the one or more users 110 to interact with the plurality of entity systems 200. The authentication application 523 may be present in the memory 520 of the computing device 500 to allow direct communication with the authentication system 300 and also the one or more automated machines 400.

The memory 520 can also store any of a number of pieces of information, and data, used by the computing device 500 and the applications and devices that make up the computing device 500 or are in communication with the computing device 500 to implement the functions of the computing device 500 and/or the other systems described herein.

FIG. 6 provides a block diagram illustrating a process flow for facilitating a secure way to allow primary users and secondary users of an entity system to perform one or more interactions on entity devices, in accordance with an embodiment of the invention.

As shown in block 605, the system receives an interaction initiation request associated with an interaction from a primary user, via an entity application located on a user device associated with the primary user, wherein the interaction initiation request comprises a location associated with an automated machine. The primary user may be a primary holder of a resource pool maintained by an entity. The entity application (e.g., entity application 524) located on the user device (e.g., computing device 500) may be an application provided by the entity that allows the primary user to perform one or more actions (e.g., checking resource pool balance, transferring resources, or the like) associated with the resource pool of the user.

In some embodiments, the primary user may be log in to the entity application and select an option to conduct an interaction at an entity device (e.g., automated machine 400). After receiving selection of the option, the entity system 200 and/or the authentication system 400 may provide one or more locations of entity devices around the current location of the primary user. The one or more locations may be associated with the geotagging of the automated machines performed by the system of the present invention. In response to displaying the one or more locations, the primary user may select at least one automated machine associated with a location of the one or more locations.

As shown in block 610, the system establishes a link with the automated machine and the user device of the primary user. In response to receiving the location of the automated machine, the system may establish a connection between the automated machine and the user device of the primary user. As shown in block 615, after establishing the connection, the system locks a session between the automated machine and the entity application located on the user device of the primary user. The session may be an application session between the user device of the primary user and the automated machine. In response to locking the session, the system may allow the primary user to provide interaction information associated with the interaction, where the interaction information may allow the primary user to complete the interaction and/or a secondary user to complete the interaction on behalf of the primary user, where the secondary user may be any user authorized by the primary user and also holds a resource pool with the entity. The interaction information may comprise information associated with the type of interaction (e.g., withdrawal of resources, deposit of resources, or the like). In some embodiments where the primary user cannot physically go to the location of the automated machine, the primary user may provide user information associated with the secondary user while submitting the interaction initiation request in block 605 such that the secondary user can complete the interaction on behalf of the primary user. The user information associated with the secondary user may comprise at least one of phone number, user id, full name, and the like associated with the secondary user. In some embodiments, upon providing the user information associated with the secondary user, the primary user may inform the secondary user about the interaction via the entity application. In response to the communication from the primary user about the interaction, the secondary user may login to entity application provided by the entity that is located on a user device of the secondary user to view information associated with the interaction (e.g., location of the automated machine, types of interaction, interaction amount, or the like).

As shown in block 620, the system identifies a trigger and transmit a first set of instructions to the automated machine, wherein the first set of instructions transform user interface of the automated machine to display a code, wherein the code is scannable by the user device of the primary user or a user device of an authorized secondary user. In some embodiments, the trigger may be determination of a match between the user device of the primary user and the location of the automated machine. In alternate embodiments, the trigger may be a determination of a match between the user device of the secondary user and the location of the automated machine. In response to identifying the trigger, the system may transmit an interaction link to the user device of the primary user or the user device of the secondary user, where the interaction link allows the primary user or the secondary user to scan the code displayed on the automated machine, where the interaction link directly transmits the code in real-time to the system of the present invention and/or the entity system 200. In some embodiments, the interaction link is generated and transmitted by the system of the present invention. In some embodiments where the primary user is physically present at the automated machine, the system does not transmit the interaction link and the process flow proceeds to block 625. In such an embodiment, the primary user may scan the code via the entity application located on the user device of the primary user. The code displayed on the automated machine may be an interaction specific code associated with the interaction initiated by the primary user. In some embodiments, the code may be a QR code. In response to determining the trigger, the system displays the code on the automated machine, where the code is scanned by the primary user or the secondary user who is physically present at the location of the automated machine.

As shown in block 625, the system receives a scanned code from the user device of the primary user or the user device of the authorized secondary user. In an embodiment where the user is physically present at the location of the automated machine to perform the interaction, the system may receive the scanned code from the user device of the primary user. In an embodiment where the secondary user is performing the interaction on behalf of the primary user, the scanned code may be received from the user device of the secondary user.

As shown in block 630, the system determines a match between the scanned code and the code displayed on the automated machine. In another embodiment where the scanned code is received from the user device of the primary user, the system notifies the primary user about the successful authentication after determining the match between the scanned code received from user device of the secondary user and the code displayed on the automated machine. The system may then transmit third set of controls signals to the user device of the primary user, where the third set of control signals transform the user interface of the entity application to receive interaction information comprising interaction amount (e.g., amount of resources associated with the interaction, or the like) from the primary user. In some embodiments, if the primary user has already provided the interaction information, the third set of control signals may prompt the primary user to confirm the interaction information. In response to receiving input associated with interaction information from the primary user, the process flow proceeds to block 635. In some embodiments, where the scanned code is received from the user device of the primary user, same process flow is applied where the system transforms the user interface of the entity application to receive interaction information from the primary user. As shown in block 635, the system transmits a second set of instructions to the automated machine, wherein the second set of instructions cause the automated machine to complete the interaction (e.g., dispensing resources, or the like). In response to completing the interaction, the system may transform fourth set of control signals to the automated machine that transform the display of the automated machine to no longer display the code.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for facilitating a secure way to allow primary users and secondary users of an entity system to perform one or more interactions on entity devices, the system comprising:
   a memory device with computer-readable program code stored thereon;
   a communication device; and
   a processing device operatively coupled to the memory device and the communication device, wherein the processing device is configured to execute the computer-readable program code to:
   receive an interaction initiation request associated with an interaction from a primary user, via an entity application located on a user device associated with the primary user, wherein the interaction initiation request comprises a location associated with an automated machine;
   establish a link with the automated machine and the user device of the primary user;
   lock a session between the automated machine and the entity application located on the user device of the primary user;
   identify a trigger and transmit a first set of instructions to the automated machine, wherein the first set of instructions transform user interface of the automated machine to display a code, wherein the code is scannable by the user device of the primary user or a user device of an authorized secondary user;
   transmit an interaction link to the user device of the authorized secondary user in response to determining that the location of the user device of the authorized secondary user matches the location of the automated machine, wherein the interaction link allows the authorized secondary user to scan the code displayed on the automated machine;
   receive a scanned code from the user device of the authorized secondary user;
   determine a match between the scanned code and the code displayed on the automated machine; and
   in response to determining the match, transmit a second set of instructions to the automated machine, wherein the second set of instructions cause the automated machine to complete the interaction for the authorized secondary user.

2. The system according to claim 1, wherein the processing device is further configured to execute the computer-readable program code to identify the trigger based on determining that a location of the user device of the primary user matches the location of the automated machine.

3. The system according to claim 2, wherein the processing device is further configured to execute the computer-readable program code to:
   transmit an interaction link to the user device of the primary user in response to determining that the location of the user device of the primary user matches the location of the automated machine, wherein the interaction link allows the primary user to scan the code displayed on the automated machine.

4. The system of claim 1, the processing device is further configured to execute the computer-readable program code to:
   in response to receiving the scanned code from the user device of the authorized secondary user and determining the match between the scanned code and the code, transmit a third set of instructions to the user device of the primary user, wherein the third set of instructions transform a user interface of the entity application to receive interaction information from the primary user;
   receive the interaction information from the primary user; and
   complete the interaction based on the interaction information.

5. The system according to claim 1, wherein receiving the interaction initiation request further comprises:
   receiving user information associated with the authorized secondary user, wherein the user information comprises at least a phone number and a user id associated with the authorized secondary user.

6. A computer program product for facilitating a secure way to allow primary users and secondary users of an entity system to perform one or more interactions on entity devices, the computer program product comprising at least one non-transitory computer readable medium having computer-readable program code portions embodied therein, the computer-readable program code portions comprising executable portions for:
   receiving an interaction initiation request associated with an interaction from a primary user, via an entity application located on a user device associated with the primary user, wherein the interaction initiation request comprises a location associated with an automated machine;
   establishing a link with the automated machine and the user device of the primary user;
   lock a session between the automated machine and the entity application located on the user device of the primary user;
   identifying a trigger and transmit a first set of instructions to the automated machine, wherein the first set of instructions transform user interface of the automated machine to display a code, wherein the code is scannable by the user device of the primary user or a user device of an authorized secondary user;
   transmitting an interaction link to the user device of the authorized secondary user in response to determining that the location of the user device of the authorized secondary user matches the location of the automated machine, wherein the interaction link allows the authorized secondary user to scan the code displayed on the automated machine;
   receiving a scanned code from the user device of the authorized secondary user;
   determining a match between the scanned code and the code displayed on the automated machine; and
   in response to determining the match, transmitting a second set of instructions to the automated machine, wherein the second set of instructions cause the automated machine to complete the interaction for the authorized secondary user.

7. The computer program product of claim 6, wherein the computer-readable program code portions comprising executable portions for identifying the trigger based on determining that a location of the user device of the primary user matches the location of the automated machine.

8. The computer program product of claim 7, wherein the computer-readable program code portions comprising executable portions for transmitting an interaction link to the user device of the primary user in response to determining that the location of the user device of the primary user matches the location of the automated machine, wherein the interaction link allows the primary user to scan the code displayed on the automated machine.

9. The computer program product of claim 6, wherein the computer-readable program code portions comprising executable portions for:
 in response to receiving the scanned code from the user device of the authorized secondary user and determining the match between the scanned code and the code, transmitting a third set of instructions to the user device of the primary user, wherein the third set of instructions transform a user interface of the entity application to receive interaction information from the primary user;
 receiving the interaction information from the primary user; and
 completing the interaction based on the interaction information.

10. A computer-implemented method for facilitating a secure way to allow primary users and secondary users of an entity system to perform one or more interactions on entity devices, the method comprising:
 receiving an interaction initiation request associated with an interaction from a primary user, via an entity application located on a user device associated with the primary user, wherein the interaction initiation request comprises a location associated with an automated machine;
 establishing a link with the automated machine and the user device of the primary user;
 lock a session between the automated machine and the entity application located on the user device of the primary user;
 identifying a trigger and transmit a first set of instructions to the automated machine, wherein the first set of instructions transform user interface of the automated machine to display a code, wherein the code is scannable by the user device of the primary user or a user device of an authorized secondary user;
 transmitting an interaction link to the user device of the authorized secondary user in response to determining that the location of the user device of the authorized secondary user matches the location of the automated machine, wherein the interaction link allows the authorized secondary user to scan the code displayed on the automated machine;
 receiving a scanned code from the user device of the authorized secondary user;
 determining a match between the scanned code and the code displayed on the automated machine; and
 in response to determining the match, transmitting a second set of instructions to the automated machine, wherein the second set of instructions cause the automated machine to complete the interaction for the authorized secondary user.

11. The computer-implemented method of claim 10, wherein identifying the trigger is based on determining that a location of the user device of the primary user matches the location of the automated machine.

12. The computer-implemented method of claim 11, wherein the method further comprises transmitting an interaction link to the user device of the primary user in response to determining that the location of the user device of the primary user matches the location of the automated machine, wherein the interaction link allows the primary user to scan the code displayed on the automated machine.

13. The computer-implemented method of claim 10, wherein the method further comprises:
 in response to receiving the scanned code from the user device of the authorized secondary user and determining the match between the scanned code and the code, transmitting a third set of instructions to the user device of the primary user, wherein the third set of instructions transform a user interface of the entity application to receive interaction information from the primary user;
 receiving the interaction information from the primary user; and
 completing the interaction based on the interaction information.

14. The computer-implemented method of claim 10, wherein receiving the interaction initiation request further comprises receiving user information associated with the authorized secondary user, wherein the user information comprises at least a phone number and a user id associated with the authorized secondary user.

* * * * *